(12) United States Patent
Suzuki et al.

(10) Patent No.: US 9,042,946 B2
(45) Date of Patent: May 26, 2015

(54) UNDERWATER COMMUNICATION DEVICE

(75) Inventors: Takashi Suzuki, Yamagata (JP);
Shinsuke Taira, Yamagata (JP)

(73) Assignee: Yamagata Casio Co., Ltd., Yamagata (JP)

( * ) Notice: Subject to any disclaimer, the term of this patent is extended or adjusted under 35 U.S.C. 154(b) by 0 days.

(21) Appl. No.: 13/636,833

(22) PCT Filed: Jan. 19, 2012

(86) PCT No.: PCT/JP2012/051130
§ 371 (c)(1),
(2), (4) Date: Sep. 24, 2012

(87) PCT Pub. No.: WO2012/099223
PCT Pub. Date: Jul. 26, 2012

(65) Prior Publication Data
US 2013/0288596 A1    Oct. 31, 2013

(30) Foreign Application Priority Data
Jan. 21, 2011    (JP) .................. 2011-011340

(51) Int. Cl.
*H04M 1/00* (2006.01)
*H04B 13/02* (2006.01)
(Continued)

(52) U.S. Cl.
CPC ............. *H04B 13/02* (2013.01); *B63C 11/26* (2013.01); *H04R 1/105* (2013.01); *H04R 1/14* (2013.01); *H04R 1/44* (2013.01); *H04R 2201/107* (2013.01)

(58) Field of Classification Search
CPC ....... H04M 1/6066; H04M 1/05; H04B 13/02
USPC .............. 455/90.1, 90.2, 90.3, 550.1, 575.1, 455/575.2, 40, 41.2; 381/151; 340/850; 367/131
See application file for complete search history.

(56) References Cited

U.S. PATENT DOCUMENTS 5,579,284 A * 11/1996 May .................. 367/132
5,586,176 A    12/1996 Peck
(Continued)

FOREIGN PATENT DOCUMENTS

JP    63-097088    4/1988
JP    03-006964    1/1991
(Continued)

OTHER PUBLICATIONS

Pass Audio Video Srl Audio Guida PASS 500: New Product Description, Dec. 31, 2009.
(Continued)

*Primary Examiner* — Nhan Le
(74) *Attorney, Agent, or Firm* — K&L Gates LLP; Louis C. Cullman; Michelle Glasky Bergman

(57) ABSTRACT

An underwater communication device (100) is provided with a voice interface (4), a transceiving unit, a voice quality converting unit and a body (1), etcetera. A bone conduction/throat microphone unit, assembled in the voice interface (4), converts the vocal cord vibrations of a diver to voice signals. The voice quality converting unit converts the voice signals to voice signals based on a clearer voice. A transmitting unit, assembled in the transceiving unit, transmits the converted voice signals to the outside. A receiving unit, assembled in the transceiving unit, receives voice data which is transmitted from the outside. A bone-conduction speaker unit, assembled in the voice interface (4), outputs vibrations corresponding to the voice data received by the receiving unit. Attachment equipment (1, 2, 3) are put on a diver in a state where the bone-conduction speaker unit is in attached to the diver. The receiving unit and the bone-conduction speaker unit are integrally attached to the body (1).

28 Claims, 14 Drawing Sheets

(51) Int. Cl.
  *B63C 11/26*  (2006.01)
  *H04R 1/14*  (2006.01)
  *H04R 1/10*  (2006.01)
  *H04R 1/44*  (2006.01)

(56) References Cited

U.S. PATENT DOCUMENTS 5,706,251 A       1/1998   May
5,889,730 A  *   3/1999   May ............................. 367/132
2002/0176323 A1  11/2002  Magine
2012/0213034 A1* 8/2012   Imran .......................... 367/132

FOREIGN PATENT DOCUMENTS

| | | |
|---|---|---|
| JP | 04-312035 | 11/1992 |
| JP | 2006-111207 | 4/2006 |
| JP | 2007-074299 | 3/2007 |
| JP | 2008-304649 | 12/2008 |

OTHER PUBLICATIONS

Extended European Search Report Published Mar. 24, 2015.

\* cited by examiner

UNDERWATER COMMUNICATION DEVICE

TECHNICAL FIELD

The present invention relates to an underwater communication device used for a conversation of divers in water.

BACKGROUND ART

An underwater communication device for a conversation in water is conventionally disclosed (refer to, for example, Patent Literature 1). Some of such underwater communication devices have a structure covering the mouth and the like of a diver by using a mask such as a full face mask or a half mask so that the diver can freely move the nose, the mouth, and the lips. By using an underwater communication device of this kind, a diver can utter voice with clear pronunciation like he is on land.

However, a mask covering the mouth and the like has a structure which cannot be easily detached and, if it is not properly used, suffocation due to air shortage or vomiting may be caused. Consequently, an actual situation is that the underwater communication device of this kind is used only by a diver who has to talk in water in the course of business such as a diver for military purpose or fire service or an underwater reporter and is not used by a leisure diver.

PRIOR ART LITERATURE

Patent Literature

Patent Literature 1: Unexamined Japanese Patent Application Kokai Publication No. 2006-111207

DISCLOSURE OF THE INVENTION

Problems to be Solved by the Invention

In leisure diving, generally, a diver dives wearing an underwater mask and holding a regulator with a mouth piece between his/her teeth. The regulator and the mask can be easily detached, and a spare octopus in the case where the regulator fails is also equipped. It can be therefore said that the regulator and the mask are highly reliable devices with their safety is also enhanced.

When a diver wears those devices, however, the nose is covered, and the motion of the lips is regulated, so that it is difficult to pronouns clearly. Particularly, the tendency is noticeable in the "PA" row, "BA" row, and "MA" row of nasal sound and plosive sound which are pronounced with the lips. As a result, even if voice can be collected by a throat microphone, a bone conduction microphone, or the like, the voice is very unclear.

In water, it is also difficult for a diver to hear voice from a speaker due to sound of breath of himself/herself.

Under such circumstances, in leisure diving, an actual situation is that it is hard to talk even with a diver nearby. In this state, it is difficult to transmit an instruction to another person or notify another person of danger.

The present invention has been made in consideration of the circumstances and an object of the invention is to provide an underwater communication device by which a diver can easily talk with another person in water while diving devices such as an underwater mask and a regulator are being put on.

Means for Solving the Problems

To solve the problem, an underwater communication device according to the present invention is an underwater communication device to be put on a diver and includes:

a receiving unit receiving voice data transmitted from the outside;

a bone conduction speaker unit outputting a vibration corresponding to the voice data received by the receiving unit; and an attachment equipment attached to the diver in a state where the bone conduction speaker unit is in contact with the diver, and the receiving unit and the bone conduction speaker unit are integrally attached to the attachment equipment.

Effects of the Invention

According to the present invention, a vibration corresponding to voice based on voice data received is output from a bone conduction speaker unit which is in contact with a diver. In such a manner, the diver can hear voice transmitted from the outside more reliably. Since it is sufficient that the underwater communication device is attached in a state where the bone conduction speaker unit is in contact with a diver, the device can be put on a diver while the diver is wearing devices of a general leisure diver such as an underwater mask and a regulator. Since the receiving unit, the bone conduction speaker unit, and the attachment equipment are integrated, the entire device is designed compactly. When the device is put on a diver, it does not disturb the diver.

BRIEF DESCRIPTION OF DRAWINGS

FIG. 1C is a diagram illustrating a state where the underwater communication device according to the first embodiment of the invention is put on;

MODE FOR CARRYING OUT THE INVENTION

Embodiments related to the present invention will be described with reference to the drawings. The invention is not limited to the embodiments and the drawings. Obviously, the embodiments and the drawings can be obviously changed (the components can be also eliminated). In the following description, to make the present invention understood easily, known technical matters which are not important will not be described.

First Embodiment

A first embodiment of the present invention will now be described.

Figure 1A:
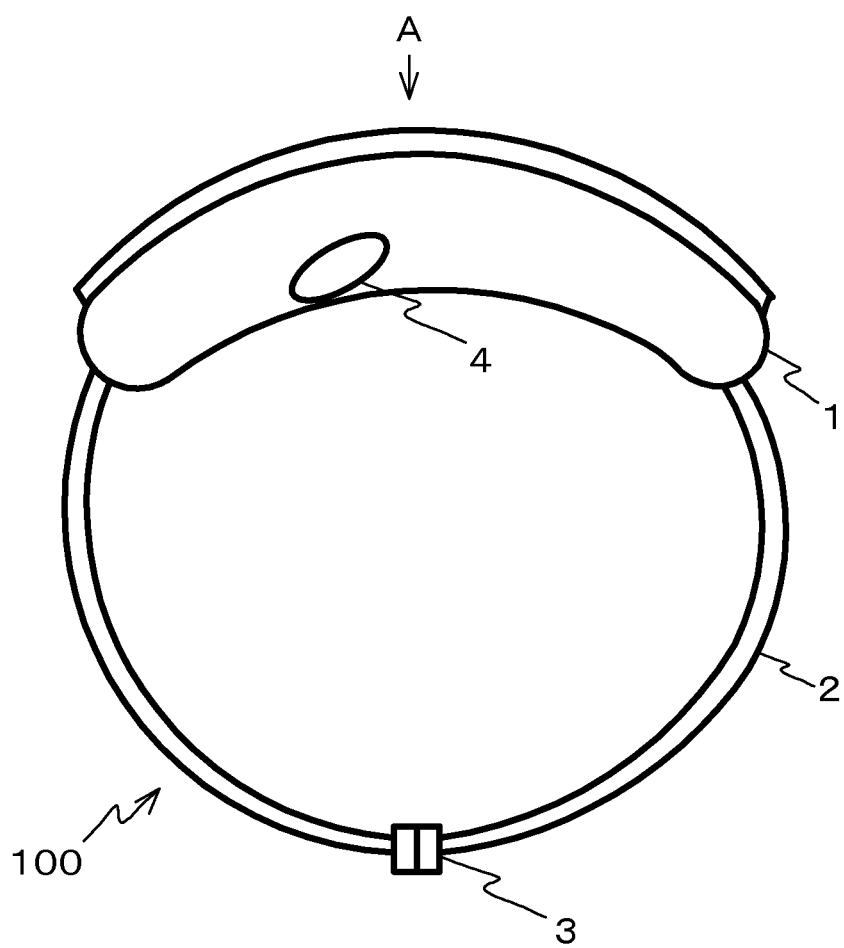
FIG. 1A is a diagram (No. 1) illustrating the appearance of an underwater communication device according to a first embodiment of the present invention.
Figure 1B:
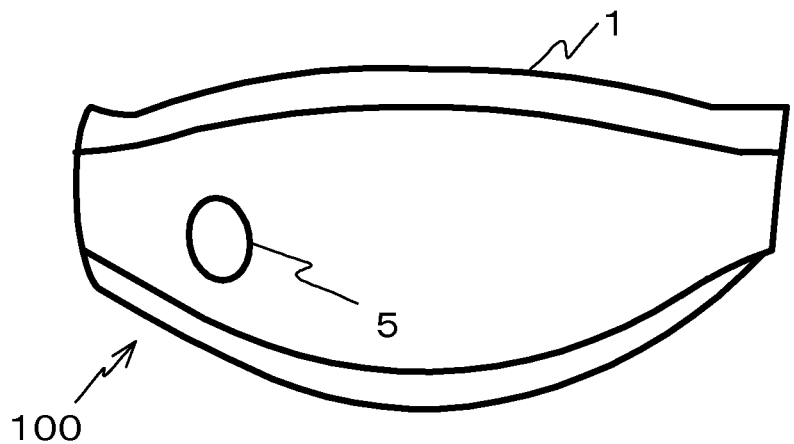
FIG. 1B is a diagram (No. 2) illustrating the appearance of the underwater communication device according to the first embodiment of the invention.

Each of FIGS. 1A and 1B illustrates the appearance of an underwater communication device 100 related to the embodiment. As illustrated in FIG. 1A, the under water communication device 100 has a body 1, strings 2, and connectors 3. By the body 1, the strings 2, and the connectors 3, attachment equipment is constructed.

Figure 1C:
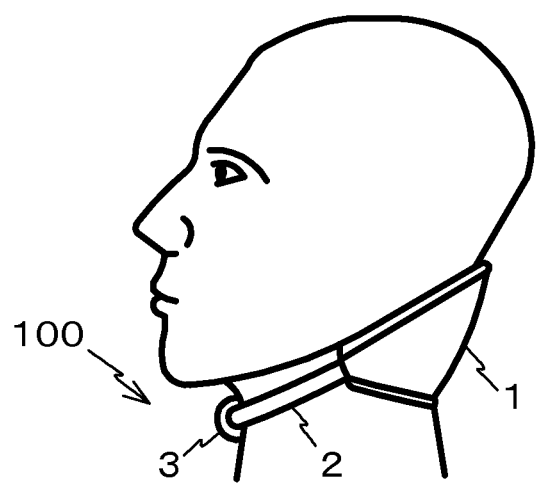

A large part of the body 1 is made of an elongated flexible member. Consequently, the body 1 is easily closely attached to the neck part of a diver as illustrated in FIG. 1C.

In the body 1, a voice interface 4 is provided. In the voice interface 4, a bone-conduction speaker unit 11 (refer to FIG. 2) which will be described later is assembled. The bone-conduction speaker unit 11 is exposed in the surface of the body 1. The material of the body 1 has soundproof and vibration-proof effects, and vibration generated from the bone-conduction speaker unit 11 is transmitted only in one direction.

The strings 2 are two strings as elastic members which are coupled to both ends of the body 1 respectively. To the other ends of the strings, connectors as a pair of connectors 3 are connected. By coupling of the pair of connectors 3, the underwater communication device 100 is fit to the neck part of a diver as illustrated in FIG. 1C. By the elastic force of the strings 2, the underwater communication device 100 is closely attached to the neck part of the diver.

In a state where it is attached to the neck part of the diver, the voice interface 4 is in contact with the back of the neck of the diver. Consequently, vibrations generated from the bone-conduction speaker unit 11 are transmitted to the ears (cochlear duct) of the diver via the bones of the diver and can be recognized as sound. The reasons why the voice interface 4 is disposed on the rear side of the neck of the diver are that the influence of exhaust sound of the diver himself/herself can be made smaller than that in the case of disposing the voice interface 4 on the front side of the neck and, moreover, the diver can hear the sound from the bone-conduction speaker unit 11 more easily.

As described above, since the embodiment employs the structure that the body 1 and the like is wound around the neck, the body 1 does not cover the area of the mouse or the eyes of the diver. Therefore, even in a state where a diver puts on an underwater mask or a regulator, the underwater communication device 100 can be attached.

FIG. 1B is a diagram viewing the underwater communication device 100 from front (from the direction of the arrow A in FIG. 1A). As illustrated in FIG. 1B, a transceiving unit 5 is provided in the front face of the body 1. The transceiving unit 5 receives ultrasonic waves included in voice data. Since the reach distance of electromagnetic waves is short in under water, ultrasonic waves are employed.

Figure 2:
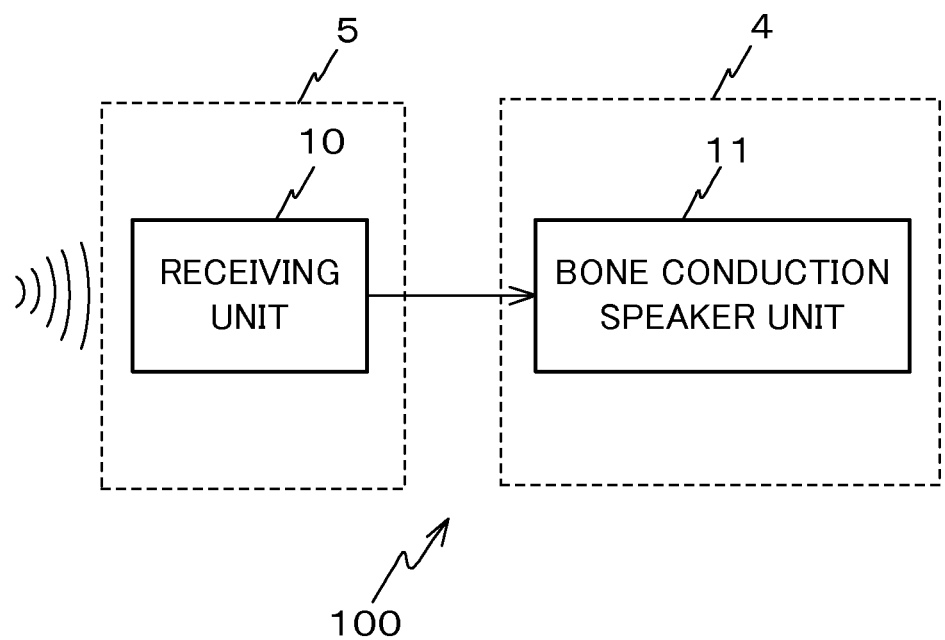
FIG. 2 is a block diagram illustrating a schematic circuit configuration of the underwater communication device of FIG. 1A.

FIG. 2 illustrates a schematic circuit configuration of the underwater communication device 100 according to the embodiment. As illustrated in FIG. 2, the underwater communication device 100 has the transceiving unit 5 and the voice interface 4 as described above.

In the transceiving unit 5, a receiving unit 10 is assembled. The receiving unit 10 has a reception antenna (not shown) for receiving ultrasonic waves transmitted from the outside and a reception circuit (not shown). The reception antenna receives voice data or ultrasonic wave including digital data which can be modulated/demodulated to voice and converts it to an electric signal. The reception circuit demodulates the electric signal output from the reception antenna to voice data and outputs the voice data. The communication method may be an analog method or a digital method. In the case of the digital method, the digital data which can be modulated/demodulated to voice is, for example, a LPC or data obtained by compressing a cepstrum value.

In the voice interface 4, the bone-conduction speaker unit 11 is assembled. The bone-conduction speaker unit 11 outputs vibration corresponding to the voice based on the voice data output from the reception circuit of the receiving unit 10.

A case where a person on a tour puts on the underwater communication device 100 according to the embodiment and can utter clear voice and a tour guide puts on another underwater communication device capable of transmitting his/her voice by ultrasonic waves will be considered. In this case, the tour guide can give a clear instruction even under water to the person on the tour.

As specifically described above, according to the embodiment, the vibration corresponding to voice based on the received voice data is output from the bone-conduction speaker unit 11 which is in contact with the diver. An output of the bone-conduction speaker unit 11 is transmitted to the cochlear duct via the skull. In such a manner, the diver can hear voice transmitted from the outside more reliably.

Since the underwater communication device 100 according to the embodiment is used in a state where it is wound around the neck of a diver, it can be put on in a state where the diver puts on common leisure diving devices such as an underwater mask and a regulator.

In the embodiment, the receiving unit 10 and the bone-conduction speaker unit 11 are integrally attached to the body 1. In such a manner, the entire device can be designed compact without exposing wires and the like to the outside. Even when a diver puts on diving equipment including many hoses, the underwater communication device 100 can be easily attached and operated.

Since the underwater communication device 100 according to the embodiment has a configuration simpler than that of any of those in the following embodiments, it is advantageous in the aspect of cost.

Second Embodiment

Next, a second embodiment of the present invention will be described.

The general configuration of the underwater communication device 100 according to the embodiment is the same as that illustrated in FIGS. 1A and 1B. The underwater communication device 100 according to the embodiment is different from the underwater communication device 100 according to the first embodiment with respect to the internal circuit configuration.

Figure 3:
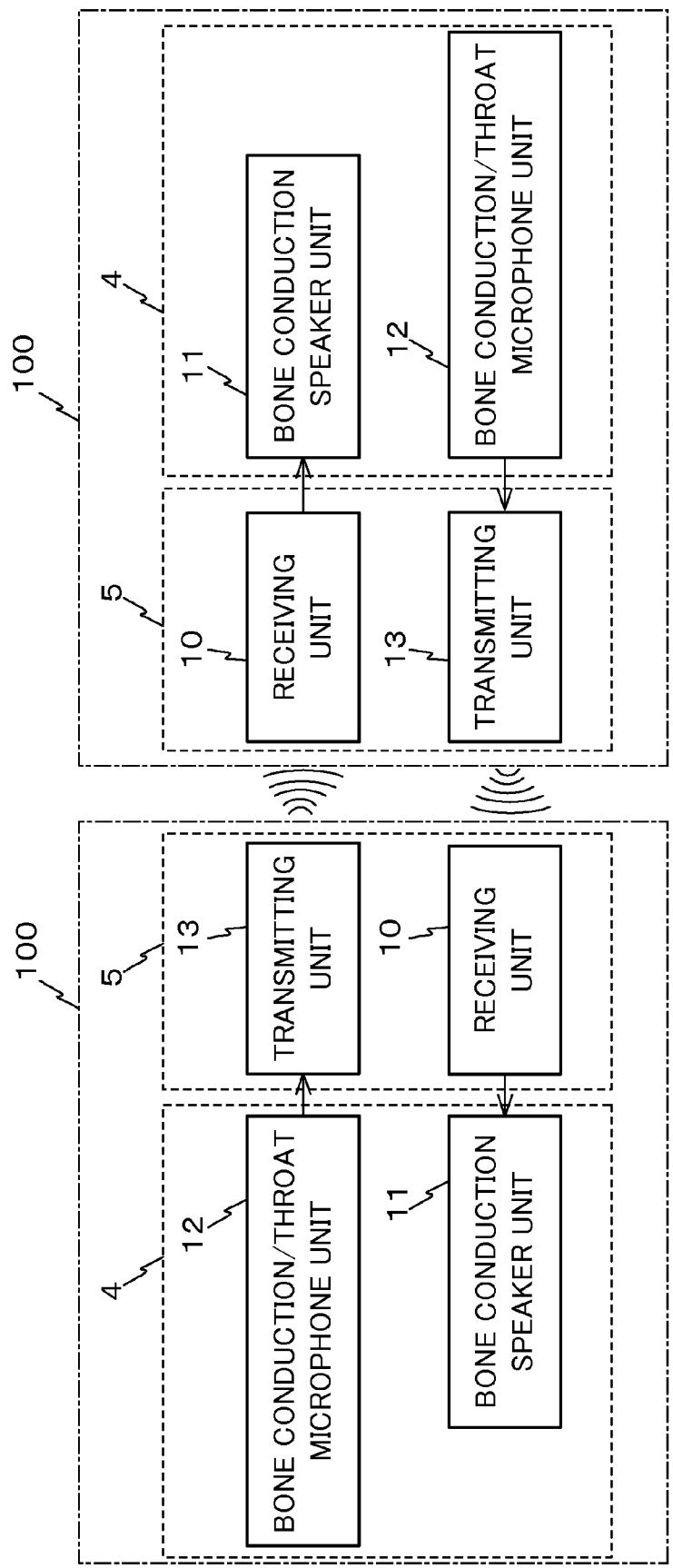
FIG. 3 is a block diagram illustrating a schematic circuit configuration of an underwater communication device according to a second embodiment of the invention.

FIG. 3 illustrates a schematic circuit configuration of the underwater communication device 100 according to the embodiment. As illustrated in FIG. 3, the underwater communication device 100 is different from that of the first embodiment with respect to the configuration of the voice interface 4 and the transceiving unit 5.

The voice interface 4 has a bone conduction/throat microphone unit 12 in addition to the bone conduction speaker unit 11. The bone conduction/throat microphone unit 12 senses vocal cord vibration of the diver via, for example, a cranial bone, converts the vibration to an electric signal (voice signal) including the voice data, and outputs the electric signal. The bone conduction/throat microphone unit 12 may be a bone conduction microphone or a throat microphone.

The transceiving unit 5 has a transmitting unit 13 in addition to the receiving unit 10. The transmitting unit 13 has a transmission circuit and a transmission antenna (which are not shown). The transmission circuit modulates the voice signal output from the bone conduction/throat microphone unit 12. The transmission antenna converts the modulated voice signal to ultrasonic waves and outputs the ultrasonic waves to the outside.

FIG. 3 illustrates a state where voice data is transmitted/received between two underwater communication devices 100. Each of the underwater communication devices 100 is attached to the neck part of a diver. As illustrated in FIG. 3, by transmission/reception of the voice data by the ultrasonic waves between the underwater communication devices 100, divers can talk with each other under water.

In this case, phonemes uttered by using lips of mouth are transmitted unclearly. However, a diver becomes accustomed to the unclear phonemes, comes to be able to listen to, for example, "yes" and "no", and can make simple communication.

In the case where each of a person on a tour and a tour guide puts on the underwater communication device 100 according to the embodiment, the tour guide can give a clear instruction to the person on the tour even under water and confirm a response from the person on the tour.

As specifically described above, according to the embodiment, the bone conduction/throat microphone unit 12 obtains the voice signal which is converted from the vocal cord vibration, and the transmitting unit 13 converts the voice signal to ultrasonic waves including the voice data and transmits the voice data to the outside. Voice based on the voice data received from the outside is output from the bone-conduction speaker unit 11. The output of the bone-conduction speaker unit 11 is transmitted to the cochlear duct via the cranial bone. Consequently, divers can have a simple conversation with each other under water.

The transmitting unit 13 may continuously transmit ultrasonic waves to the outside or may transmit ultrasonic waves to the outside on the basis of an operation on a PTT (Push To Talk) button for operation which is provided separately. The transmitting unit 13 may have a VOX (Voice Operation Transmission) function and, on detection of the voice data which is output from the bone conduction/throat microphone unit 12, may automatically transmit ultrasonic waves to the outside.

In the foregoing embodiment, the receiving unit 10 has the reception antenna, and the transmitting unit 13 has the transmission antenna. Consequently, an optimum antenna adapted to the characteristic of reception or transmission can be employed. On the other hand, the transceiving unit 5 may have a transmission/reception antenna having the functions of a reception antenna and a transmission antenna. In such a manner, the underwater communication device 100 can be miniaturized, and it is advantageous also from the viewpoint of cost.

Since the underwater communication device 100 according to the embodiment is used in a state where it is wound around the neck of a diver, it can be put on even in a state where the diver puts on common leisure diving devices such as an underwater mask and a regulator.

In the embodiment, the receiving unit 10, the bone-conduction speaker unit 11, the transmitting unit 13, and the bone conduction/throat microphone unit 12 are integrally attached to the body 1. In such a manner, the entire device can be designed compactly, and does not disturb a diver when it is put on the diver.

At least one of the receiving unit 10, the bone-conduction speaker unit 11, the bone conduction/throat microphone unit 12, and the transmitting unit 13 may be used in a state where it is detached and separated from the body 1 (in a state where it is apart from the body 1). In this case, the part apart from the body 1 is connected to a corresponding part (the bone conduction speaker unit 11 and the receiving unit 10 or the bone conduction/throat microphone unit 12 and the transmitting unit 13) in the body 1 by a cable (not illustrated) which transmits the voice signal.

With such a configuration, for example, the flexibility of the attachment position of the receiving unit 10, the bone-conduction speaker unit 11, the bone conduction/throat microphone unit 12, and the transmitting unit 13 can be increased. For example, the body 1 can be put on the neck of a diver, and the bone-conduction speaker unit 11 and the bone conduction/throat microphone unit 12 can be attached to a mask strap. When the each unit can be separated, maintenance and the like of the device is facilitated.

At least one of the receiving unit 10, the bone-conduction speaker unit 11, the bone conduction/throat microphone unit 12, and the transmitting unit 13 may not be assembled in the body 1 from the beginning. In this manner, the body 1 can be further miniaturized.

Since the underwater communication device 100 according to the embodiment has a configuration simpler than that of any of those in the following embodiments, it is advantageous in the aspect of cost.

Third Embodiment

Next, a third embodiment of the present invention will be described.

The general configuration of the underwater communication device 100 according to the embodiment is the same as that illustrated in FIGS. 1A and 1B. The underwater communication device 100 according to the embodiment is different from the underwater communication devices 100 according to the first and second embodiments with respect to the internal circuit configuration.

Figure 4:
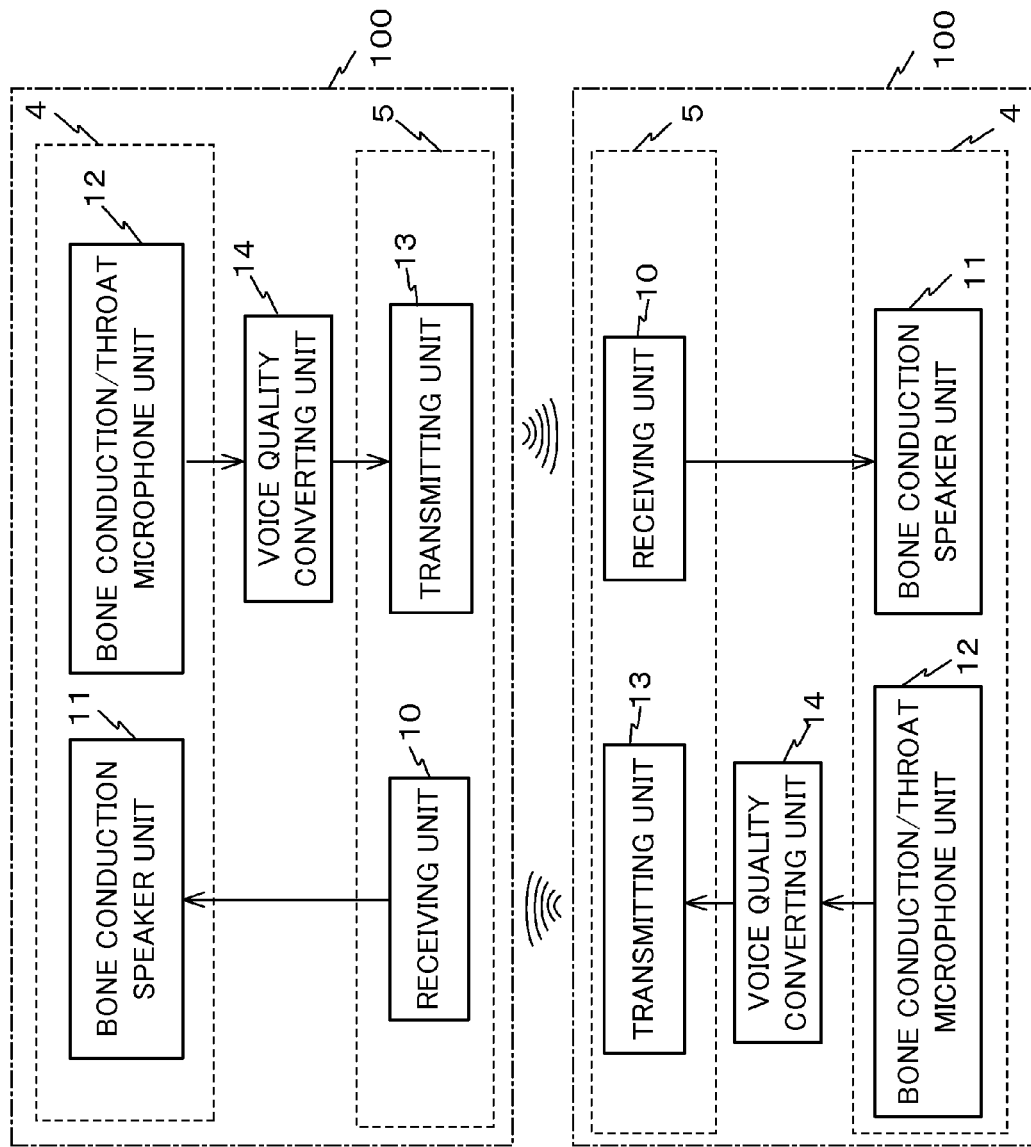
FIG. 4 is a block diagram illustrating a schematic circuit configuration of an underwater communication device according to a third embodiment of the invention.

As illustrated in FIG. 4, the underwater communication device 100 according to the embodiment is different from that of the second embodiment with respect to the point that it also has a voice quality converting unit 14.

The voice quality converting unit 14 receives a voice signal output from the bone conduction/throat microphone unit 12. The voice quality converting unit 14 performs, for example, phoneme analyzing process and voice recognizing process, converts voice based on the received voice signal to clearer voice, and outputs a voice signal corresponding to the converted voice to the transmitting unit 13.

The voice quality converting unit 14 may convert unclear voice to clear voice on a phoneme unit basis or may recognize unclear voice and convert it to clear artificial voice. In this case, voice quality conversion using a database connecting unclear voice data and clear voice data may be performed. To extract a voice characteristic, cepstrum or linear predictive method (LPC) can be used. For voice recognition, the hidden Markov model (HMM) can be used.

As described above, according to the embodiment, voice which is unclear under water is transmitted as clear voice by ultrasonic waves, so that clear conversation can be made even under water.

In the embodiment, the receiving unit 10, the bone-conduction speaker unit 11, the bone conduction/throat microphone unit 12, the transmitting unit 13, and the voice quality converting unit 14 are integrally attached to the body 1. In such a manner, the entire device can be designed compactly, and does not disturb a diver when it is put on the diver.

At least one of the receiving unit 10, the bone-conduction speaker unit 11, the bone conduction/throat microphone unit 12, the transmitting unit 13, and the voice quality converting unit 14 can be used in a state where it is detached and separated from the body 1 (in a state where it is apart from the body 1). In this case, the part apart from the body 1 is connected to a corresponding part (the bone conduction speaker unit 11 and the receiving unit 10 or the bone conduction/throat microphone unit 12 and the transmitting unit 13) in the body 1 by a cable (not illustrated) which transmits the voice signal.

With such a configuration, as described in the second embodiment, the flexibility of the attachment position of the receiving unit 10, the bone-conduction speaker unit 11, the bone conduction/throat microphone unit 12, the transmitting unit 13, and the voice quality converting unit 14 can be increased.

At least one of the receiving unit 10, the bone-conduction speaker unit 11, the bone conduction/throat microphone unit 12, the transmitting unit 13, and the voice quality converting unit 14 may not be assembled in the body 1 from the beginning. In this manner, the body 1 can be further miniaturized.

The underwater communication device 100 may be attached so that the directivity of the reception antenna in the receiving unit 10 and the transmission antenna in the transmitting unit 13 is set to the forward of the diver. Usually, a conversation in the water is made toward the other person. Consequently, by receiving the ultrasonic waves from the front of the diver and outputting the ultrasonic waves to the front of the diver, reception sensitivity increases. In such a manner, propagation of the ultrasonic waves is not disturbed by the body of a diver, so that the reception sensitivity increases.

Fourth Embodiment

Next, a fourth embodiment of the present invention will be described.

Figure 5:
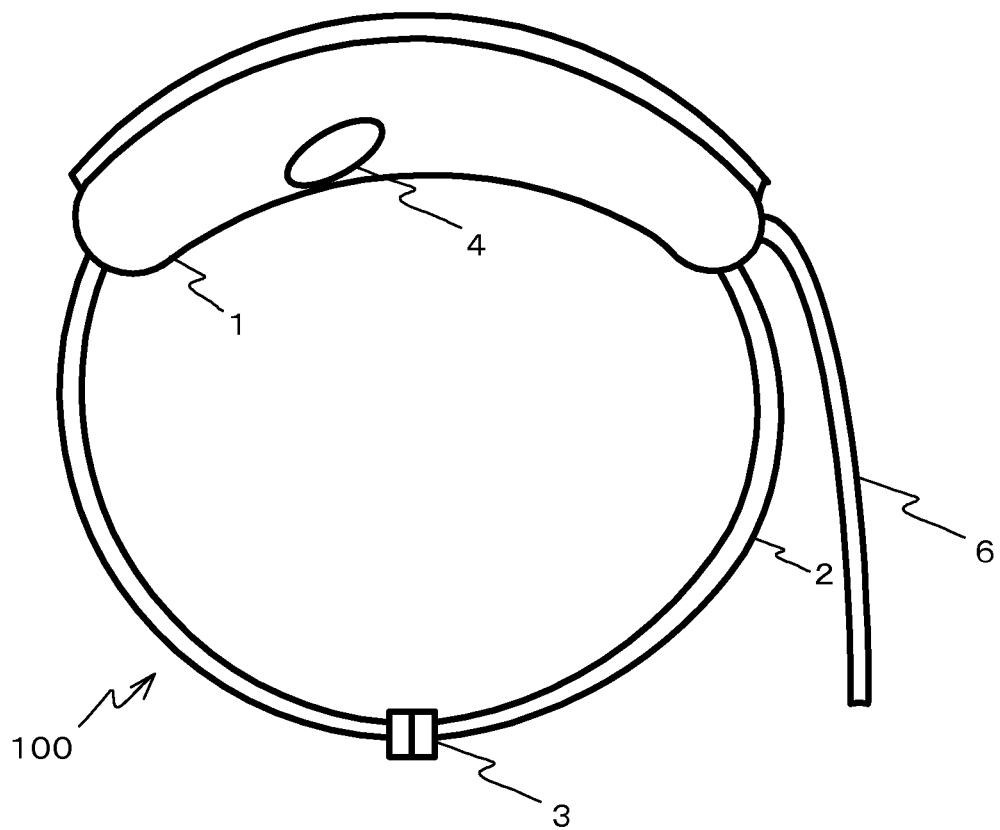
FIG. 5 is a diagram illustrating the appearance of an underwater communication device according to a fourth embodiment of the invention.

FIG. 5 illustrates the appearance of the underwater communication device 100 according to the embodiment. As illustrated in FIG. 5, the underwater communication device 100 according to the embodiment has a cable 6 in addition to the components of the underwater communication device 100 illustrated in FIG. 1A. The cable 6 is connected to the body 1. In the cable 6, for example, an optical fiber or the like is assembled. Light emitted from the body 1 enters the cable 6, passes through the cable 6 (for example, the optical fiber), and goes out from the end which is not connected to the body 1. The cable 6 can be freely bent. For example, the end of the cable 6 can be led to the inside of the visual field (preferably, a corner of the visual field) of a diver who puts on a mask. The diver can recognize light emission at the front end of the cable 6.

Figure 6:
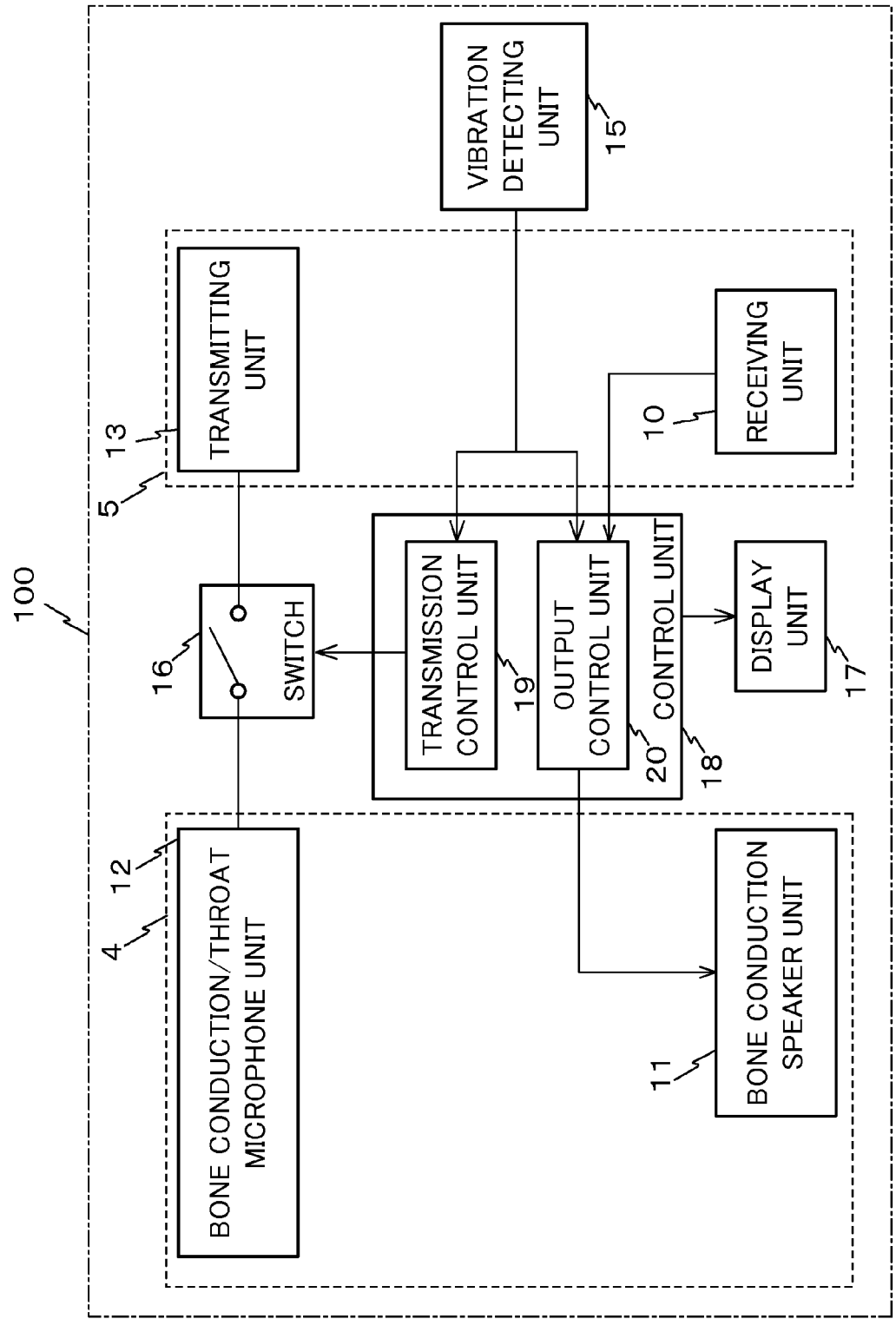
FIG. 6 is a block diagram illustrating a schematic circuit configuration of the underwater communication device according to the fourth embodiment of the invention.

The internal circuit configuration of the underwater communication device 100 according to the embodiment is different from that of the underwater communication device 100 according to the second embodiment. As illustrated in FIG. 6, the underwater communication device 100 according to the embodiment is different from that of the second embodiment with respect to the point that it further includes a vibration detecting unit 15, a switch 16, a display unit 17, and a control unit 18.

The receiving unit 10 outputs voice data to the control unit 18, not to the bone conduction speaker unit 11. The vibration detecting unit 15 detects vibrations of the underwater communication device 100. For example, the vibration detecting unit 15 has an acceleration sensor and detects vibration caused when the diver taps the body 1. When the vibration detecting unit 15 detects the vibration, it outputs a detection signal to the control unit 18. The vibration detecting unit 15 may detect vibration by, not necessarily the acceleration sensor but a gyroscope or the like.

The switch 16 switches the on/off state of output of the voice signal from the bone conduction/throat microphone unit 12 to the transmitting unit 13 under control of the control unit 18. The bone conduction/throat microphone unit 12 outputs the voice signal to the transmitting unit 13 but the voice signal is supplied to the transmitting unit 13 only when the switch 16 is on. That is, when the switch 16 is on, the voice signal output from the bone conduction/throat microphone unit 12 is supplied to the transmitting unit 13. When the switch 16 is off, the voice signal output from the bone conduction/throat microphone unit 12 is not supplied to the transmitting unit 13.

The display unit 17 has the cable 6 and an LED (Light Emitting Diode, not shown). The display unit 17 makes the LED emit light under control of the control unit 18. The LED light is led to the end of the cable 6 via the optical fiber. The display unit 17 may emit a plurality of kinds of light such as red, white, and blue, blink light, or emit light corresponding to display of a character string. For example, by disposing the cable 6 so that light emitted from the tip of the cable 6 is displayed in a lens of a mask which is put on a diver, the light emission by the display unit 17 is more easily visually recognized by the diver.

The control unit 18 controls the operation of the transmitting unit 13 and the bone conduction speaker unit 11 on the basis of the vibration detected by the vibration detecting unit 15. More specifically, the control unit 18 has a transmission control unit 19 and an output control unit 20. The transmission control unit 19 makes the transmitting unit 13 start or finish transmission of the voice signal on the basis of the vibration detected by the vibration detecting unit 15. For example, by outputting a switch signal to the switch 16, the transmission control unit 19 switches the on/off state of the switch 16. When the detection signal is output from the vibration detecting unit 15, the transmission control unit 19 outputs the switch signal to the switch 16. When the switch 16 which is in the on state receives the switch signal, it becomes off. On the other hand, when the switch 16 which is in the off state receives the switch signal, it becomes on.

The output control unit 20 controls the output from the bone conduction speaker unit 11 on the basis of the vibration detected by the vibration detecting unit 15. The control by the output control unit 20 is performed in accordance with the detection signal output from the vibration detecting unit 15. For example, when the detection signal is output twice at the interval of one second or less from the vibration detecting unit 15, the output control unit 20 enlarges the vibration which is output to the bone conduction speaker unit 11. When the detection signal is output three times at the interval of one second or less from the vibration detecting unit 15, the output control unit 20 reduces the vibration which is output to the bone conduction speaker unit 11. By such an operation, the output control unit 20 can adjust the volume recognized by the diver.

The control unit 18 controls the display unit 17. By the control of the control unit 18, the display unit 17 displays the operation state of the transmitting unit 13 and the bone conduction speaker unit 11 within the visual field of the diver. For example, the control unit 18 makes the display unit 17 display start or finish of transmission of the voice signal by the transmission control unit 19 and the state of control on the output from the bone conduction speaker unit 11 by the output control unit 20. Only in the case where the switch 16 is on, the control unit 18 controls the display unit 17 to make an LED emit light. By the operation, the tip of the cable 6 emits light, and the diver can recognize that the voice signal is transmitted to the outside. In the case where the output control unit 20 enlarges the vibration which is output to the bone conduction speaker unit 11, the control unit 18 controls the display unit 17 to make a blue LED emit light. By the operation, blue light is emitted from the tip of the cable 6, and the diver can confirm that the volume is increased. On the other hand, in the case where the output control unit 20 reduces the vibration which is output to the one conduction speaker unit 11, the control unit 18 controls the display unit 17 to make an LED of a color different from blue, for example, white emit light. By the operation, white light is emitted from the tip of the cable 6, and the diver can confirm that the volume is decreased.

The operation of starting/finishing a conversation in the underwater communication device 100 according to the embodiment will be described. It is assumed that, in the initial state, the switch 16 is off, and the display unit 17 emits no light.

In the case of starting a conversation, the diver taps the body 1 once, and the vibration detecting unit 15 detects the vibration. The vibration detecting unit 15 outputs a detection signal to the control unit 18. The transmission control unit 19 outputs a switch signal to the switch 16. In response to the signal, the switch 16 is changed from the off state to the on state, so that the voice signal output from the bone conduction/throat microphone unit 12 is supplied to the transmitting unit 13. The transmitting unit 13 converts the voice signal to ultrasonic waves and outputs the ultrasonic waves to the outside. When the transmission control unit 19 outputs a switch signal to the switch 16, the control unit 18 controls the display unit 17 to make the LED emit light. The tip of the cable 6 emits light, and the diver can recognize that his/her voice is transmitted to the outside.

In the case of finishing a conversation, the diver taps the body 1 once, and the vibration detecting unit 15 detects the vibration. The vibration detecting unit 15 outputs a detection signal to the control unit 18. The transmission control unit 19 outputs a switch signal to the switch 16. In response to the signal, the switch 16 is changed from the on state to the off state, so that the voice signal output from the bone conduction/throat microphone unit 12 is not supplied to the transmitting unit 13. When the transmission control unit 19 outputs a switch signal to the switch 16, the control unit 18 controls the display unit 17 to finish the light emission of the LED. The tip of the cable 6 emits no light, and the diver can recognize that his/her voice is not transmitted to the outside.

Next, operation of adjusting the volume of a conversation using the underwater communication device 100 according to the embodiment will be described using the case of increasing the volume as an example.

When the diver taps the body 1 twice in a row at an interval of 0.5 second in order to increase the volume of a conversation, the vibration detecting unit 15 detects two vibrations. The vibration detecting unit 15 outputs the detection signal in a row to the control unit 18. Since the detection signal is output twice at the interval of one second or less from the vibration detecting unit 15, the output control unit 20 enlarges the vibration which is output to the bone conduction speaker unit 11. At this time, the control unit 18 controls the display unit 17 to make an LED of blue emit light. Consequently, the diver can visually recognize blue light emitted from the tip of the cable 6 and confirm that the volume is increased.

As described above in detail, according to the embodiment, by simple operation of tapping the underwater communication device 100, switching between start and finish of transmission of the voice signal to the outside and an output from the bone conduction speaker unit 11 can be controlled. Therefore, operability improves.

Particularly, in water, since a diver wears gloves or holds equipment or the like in his/her both hands, there is a case that complicated operation such as pressing of the PTT button for operation is difficult. In the case of using the above-described VOX function, since a voice signal is erroneously output to the outside in response to an exhaust sound, or a voice signal is not output to the outside due to small voice of a diver, the operation and adjustment is difficult. In the embodiment, however, the underwater communication device 100 can be operated by the simple operation of tapping the underwater communication device 100, so that it is suitably used under water in which operation is not easy.

Some wireless devices have a function of notifying a diver of a state in which a signal is being transmitted by outputting a signal sound of 1 KHz sine wave or the like at the time of start or finish of transmission of a signal from a speaker. By the function, however, the diver cannot recognize the state in which a signal is being transmitted without consistently being aware of the signal sound. It is a burden for the diver. Since the underwater communication device 100 according to the embodiment has the display unit 17, the diver can easily recognize whether his/her voice is transmitted to the outside or not and the control state of an output from the bone conduction speaker unit 11. Consequently, the convenience is further increased.

Although the display unit 17 has the cable 6 in the embodiment, the display unit 17 may not have the cable 6. In this case, it is sufficient to dispose the LEDs of the display unit 17 in the visual field of the diver.

Although adjustment of the volume by the output control unit 20 has been described in the embodiment, the control by the output control unit 20 is not limited to the adjustment of the volume but may be adjustment of mute, tone, or pitch of sound, or the like.

In the embodiment, finishing of a conversation by using the vibration detecting unit 15 has been described. However, in the case where the bone conduction/throat microphone unit 12 outputs a voice signal to the control unit 18 and no voice signal is output from the bone conduction/throat microphone unit 12 for predetermined time, that is, in the case of no sound, the transmission control unit 19 may output a switch signal to the switch 16. By the operation, the voice signal is not supplied to the transmitting unit 13, and the conversation can be finished. At this time, the control unit 18 makes the display unit 17 finish light emission of the LED. Consequently, the tip of the cable 6 does not emit light, and the diver can recognize that his/her voice is not transmitted to the outside.

In the embodiment, the receiving unit 10, the bone conduction speaker unit 11, the bone conduction/throat microphone unit 12, the transmitting unit 13, the vibration detecting unit 15, the transmission control unit 19, the output control unit 20, and the display unit 17 are integrally attached to the body 1. In such a manner, the entire device can be designed compactly, and does not disturb a diver when it is put on the diver.

At least one of the receiving unit 10, the bone-conduction speaker unit 11, the bone conduction/throat microphone unit 12, the transmitting unit 13, the vibration detecting unit 15, the transmission control unit 19, the output control unit 20, and the display unit 17 may be used in a state where it is detached and separated from the body 1 (in a state where it is apart from the body 1). In this case, the part apart from the body 1 is connected to a corresponding part (the bone conduction speaker unit 11 and the receiving unit 10 or the bone conduction/throat microphone unit 12 and the transmitting unit 13) in the body 1 by a cable (not illustrated) which transmits the voice signal.

With such a configuration, the flexibility of the attachment position of the receiving unit 10, the bone conduction speaker unit 11, the bone conduction/throat microphone unit 12, the transmitting unit 13, the vibration detecting unit 15, the transmission control unit 19, the output control unit 20, and the display unit 17 can be increased.

The underwater communication device 100 according to the embodiment may have the voice quality converting unit 14 in the third embodiment. In this case, the switch 16 may switch the on/off state of the output of the voice signal from the bone conduction/throat microphone unit 12 to the voice quality converting unit 14 or may switch the on/off state of the output to the transmitting unit 13 of the voice signal corresponding to the voice converted by the voice quality converting unit 14. In this case, the control unit 18 may make the display unit 17 display the on/off state of conversion of voice by the voice quality converting unit 14.

The receiving unit 10, the bone conduction speaker unit 11, the bone conduction/throat microphone unit 12, the transmitting unit 13, the voice quality converting unit 14, the vibration quality converting unit 14, the vibration detecting unit 15, the transmission control unit 19, the output control unit 20, and the display unit 17 may be integrally attached to the body 1. In such a manner, the entire device can be designed compactly, and does not disturb when the device is put on a diver.

At least one of the receiving unit 10, the bone-conduction speaker unit 11, the bone conduction/throat microphone unit 12, the transmitting unit 13, the vibration quality converting unit 14, the vibration detecting unit 15, the transmission control unit 19, the output control unit 20, and the display unit 17 may be used in a state where it is detached and separated from the body 1 (in a state where it is apart from the body 1). In this case, the part apart from the body 1 is connected to a corresponding part (the bone conduction speaker unit 11 and the receiving unit 10 or the bone conduction/throat microphone unit 12 and the transmitting unit 13) in the body 1 by a cable (not illustrated) which transmits the voice signal.

With such a configuration, the flexibility of the attachment position of the receiving unit 10, the bone conduction speaker unit 11, the bone conduction/throat microphone unit 12, the transmitting unit 13, the voice quality converting unit 14, the vibration detecting unit 15, the transmission control unit 19, the output control unit 20, and the display unit 17 can be increased.

Also in any of the first to third embodiments, by having the vibration detecting unit 15 and the control unit 18, the underwater communication device 100 may control transmission of the voice signal from the transmitting unit 13, output from the bone conduction speaker unit 11, and conversion of the voice signal by the voice quality converting unit 14 on the basis of the vibration detected by the vibration detecting unit 15. By having the display unit 17, the underwater communication device 100 may display not only the operation state of the transmitting unit 13 and the bone conduction speaker unit 11 but also the on/off state of conversion of the voice signal by the voice quality converting unit 14.

Fifth Embodiment

Next, a fifth embodiment of the present invention will be described.

The general configuration of the underwater communication device 100 according to the embodiment is the same as that illustrated in FIGS. 1A and 1B. The underwater communication device 100 according to the embodiment is different from the underwater communication devices 100 according to the second embodiment with respect to the internal circuit configuration.

Figure 7:
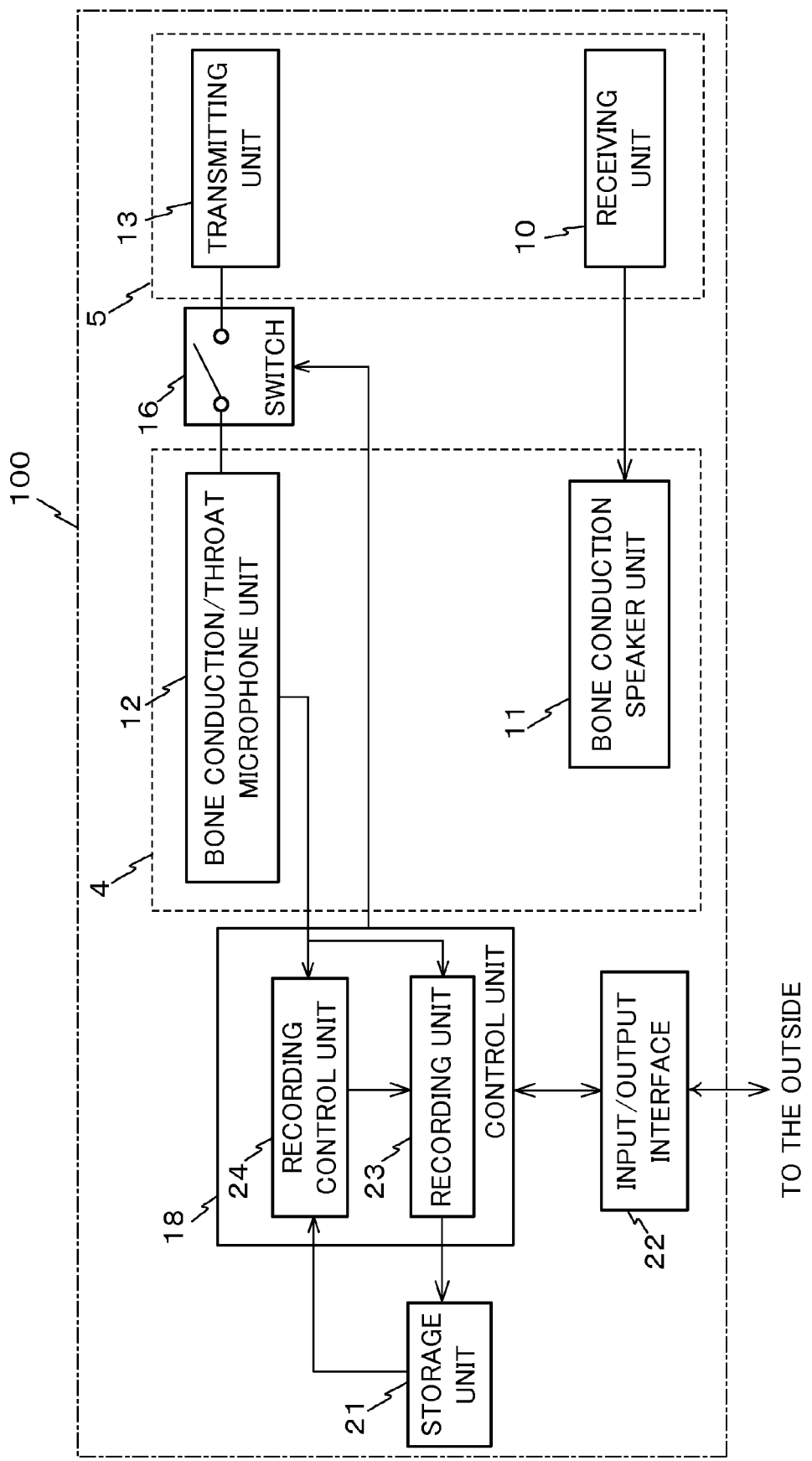
FIG. 7 is a block diagram illustrating a schematic circuit configuration of an underwater communication device according to a fifth embodiment of the invention.

As illustrated in FIG. 7, the underwater communication device 100 according to the embodiment is different from that of the second embodiment with respect to the point that it also has the switch 16, the control unit 18, a storage unit 21, and an input/output interface 22.

In the embodiment, the bone conduction/throat microphone unit 12 outputs the voice signal to the control unit 18. In a manner similar to the fourth embodiment, the switch 16 switches whether or not the voice signal is output from the bone conduction/throat microphone unit 12 to the transmitting unit 13 under control of the control unit 18.

The storage unit 21 is, for example, a memory such as an RAM (Random Access Memory). The storage unit 21 stores voice data.

The input/output interface 22 receives voice data or the like supplied from the outside. The input/output interface 22 supplies the received voice data or the like to the control unit 18. The input/output interface 22 outputs voice data or the like which is output from the control unit 18 to the outside.

The control unit 18 has a recording unit 23 and a recording control unit 24. The recording unit 23 converts the voice signal output from the bone conduction/throat microphone unit 12 to voice data and stores the voice data in the storage unit 21.

The recording control unit 24 recognizes a voice command from a diver included in the voice signal which is output from the bone conduction/throat microphone unit 12. The voice command is voice associated with a predetermined operation. The recording control unit 24 performs a phoneme analyzing process and a voice recognizing process to recognize the voice command included in the voice signal.

The recording control unit 24 makes the recording unit 23 start or finish storing the voice data on the basis of the recognized voice command. For example, the recording control unit 24 executes an operation corresponding to a voice command by referring to a voice command table in which a voice command and a predetermined operation are associated with each other, stored in the storage unit 21.

Hereinafter, a case where, for example, an operation "starting of storage" is associated with a voice command "recording start", and an operation "finishing of storage" is associated with a voice command "storage stop" in the voice command table will be described. It is assumed that, as a precondition, the switch 16 is in the on state.

The recording control unit 24 recognizes "recording start" included in the voice signal output from the bone conduction/throat microphone unit 12. Subsequently, the recording control unit 24 makes the recording unit 23 start storing the voice data. In response to it, the recording unit 23 converts the voice signal output from the bone conduction/throat microphone unit 12 to voice data, and stores the voice data into the storage unit 21. When "recording start" is recognized by the recording control unit 24, the control unit 18 outputs a switch signal to the switch 16. In response to the signal, the switch 16 is switched to the off state. By such an operation, after starting of storage of voice data by the recording unit 23, the voice signal output from the bone conduction/throat microphone unit 12 is not transmitted from the transmitting unit 13 to the outside.

In a state where the recording unit 23 stores the voice data in the storage unit 21, the recording control unit 24 recognizes "recording stop" included in the voice signal output from the bone conduction/throat microphone unit 12. The recording control unit 24 finishes the storage of the voice data by the recording unit 23. When "recording stop" is recognized by the recording control unit 24, the control unit 18 may output a switch signal to the switch 16. In response to the signal, the switch 16 is switched to the on state. By such an operation, after finishing of storage of voice data by the recording unit 23, the voice signal can be transmitted from the transmitting unit 13 to the outside.

The control unit 18 outputs the voice data stored in the storage unit 21 to the input/output interface 22. In such a manner, for example, after diving, the voice data stored in the storage unit 21 can be stored into a USB (Universal Serial Bus) memory or the like via the input/output interface 22. The voice data stored in the USB memory can be loaded to a PC (Personal Computer) or the like and used for various applications.

An example of the applications is a voice memo. Under water, a diver carries an oxygen tank on his/her back, has many devices such as hoses, an underwater camera, and a light, and wears a protection suit and gloves, so that it is difficult to write what the diver observes into a memo. Consequently, the diver has to record what he/she observed under water and the like on the basis of his/her memory after the diving. By using the underwater communicating device 100, what a diver wants to write in a memo can be accurately recorded.

As another application, voice uttered by the diver under water and caption made from the voice can be added to a moving picture obtained under water. Since an underwater shooting device is designed on precondition of usage on land, a land microphone is provided and sound under water cannot be clearly recorded. In contrast, by using the underwater communicating device 100, sound under water can be accurately recorded. Therefore, a vivid conversation or narration can be added to a moving picture captured under water.

As described above in detail, according to the embodiment, voice data obtained by converting a voice signal which is output from the bone conduction/throat microphone unit 12 can be stored. Therefore, without using a special device such as a full-face mask, voice under water can be recorded.

According to the embodiment, storage of voice data can be started or finished by the voice command. Although the motion of hands is limited in water, a diver can perform the operation of starting/finishing recording only by utterance, so that the convenience improves.

Also in the second to fourth embodiments, the underwater communication device 100 may control transmission of a voice signal from the transmitting unit 13, output from the bone conduction speaker unit 11, conversion of the sound signal by the voice quality converting unit 14, display by the display unit 17, and the like.

The underwater communication device 100 may separately have a PTT button for operation. In this case, for example, the recording control unit 24 may start or finish storage of voice data in the recording unit 23 on the basis of a specific operation (long press, quick press of three times, or the like) on the PTT button.

In the embodiment, storage of voice data is started or finished by the voice command. In a manner similar to the fourth embodiment, the underwater communication device 100 may have the vibration detecting unit 15. In this case, the control unit 18 may control start or finish of storage of voice data by the recording unit 23 on the basis of a vibration detected by the vibration detecting unit 15. The underwater communication device 100 may have the display unit 17. In this case, the control unit 18 may display start or finish of storage of voice data by the recording unit 23 on the display unit 17.

In the embodiment, the recording unit 23 converts a voice signal output from the bone conduction/throat microphone unit 12 to voice data. The recording unit 23 may convert a voice signal corresponding to voice converted to clearer voice by the voice quality converting unit 14 in the third embodiment to voice data.

The storage unit 21 may be another readable and writable memory or an external storage such as a USB memory.

Sixth Embodiment

Next, a sixth embodiment of the present invention will be described.

The general configuration of the underwater communication device 100 according to the embodiment is the same as that illustrated in FIGS. 1A and 1B. The underwater communication device 100 according to the embodiment is different from the underwater communication devices 100 according to the fifth embodiment with respect to the internal circuit configuration.

Figure 8:
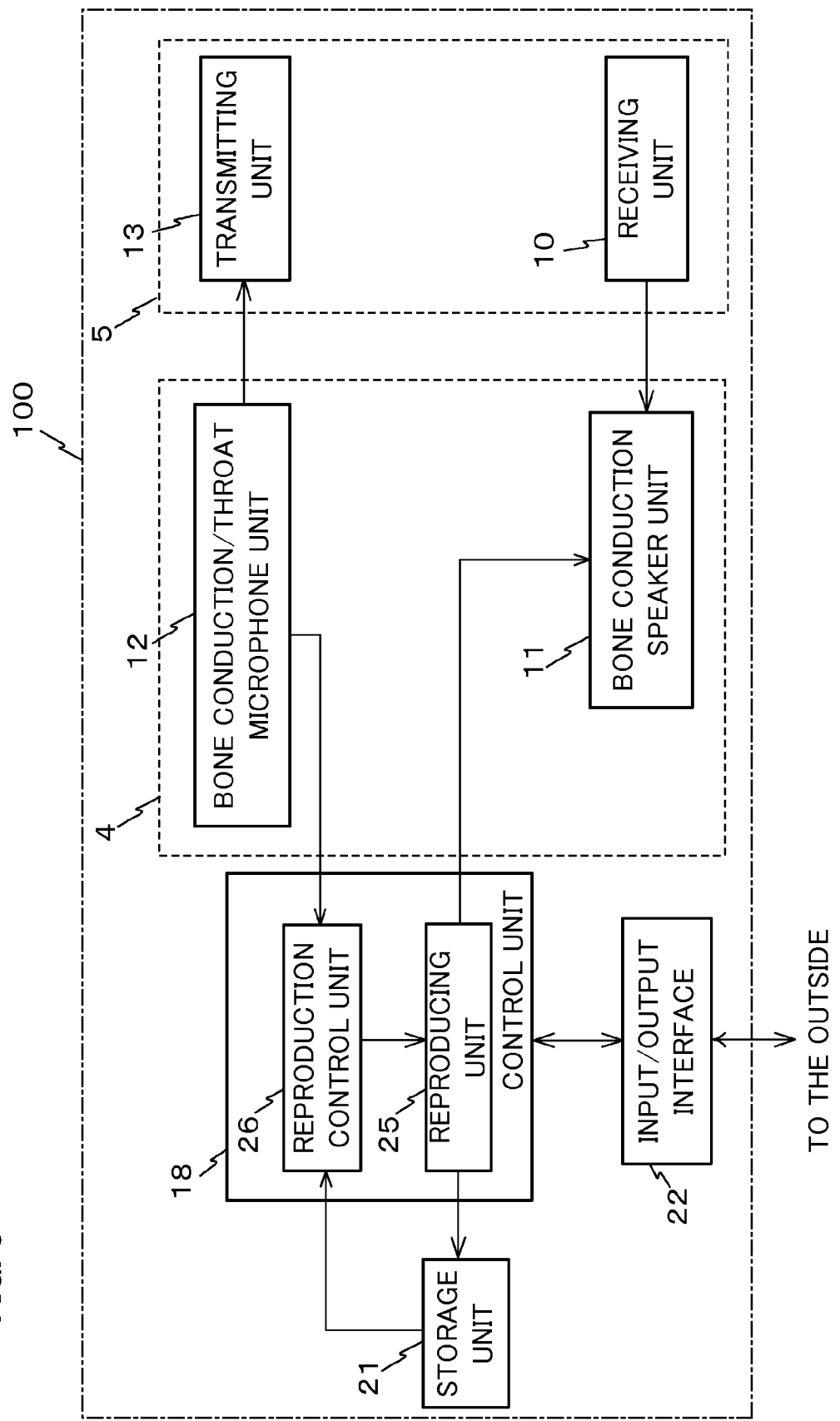
FIG. 8 is a block diagram illustrating a schematic circuit configuration of an underwater communication device according to a sixth embodiment of the invention.
Figure 9:
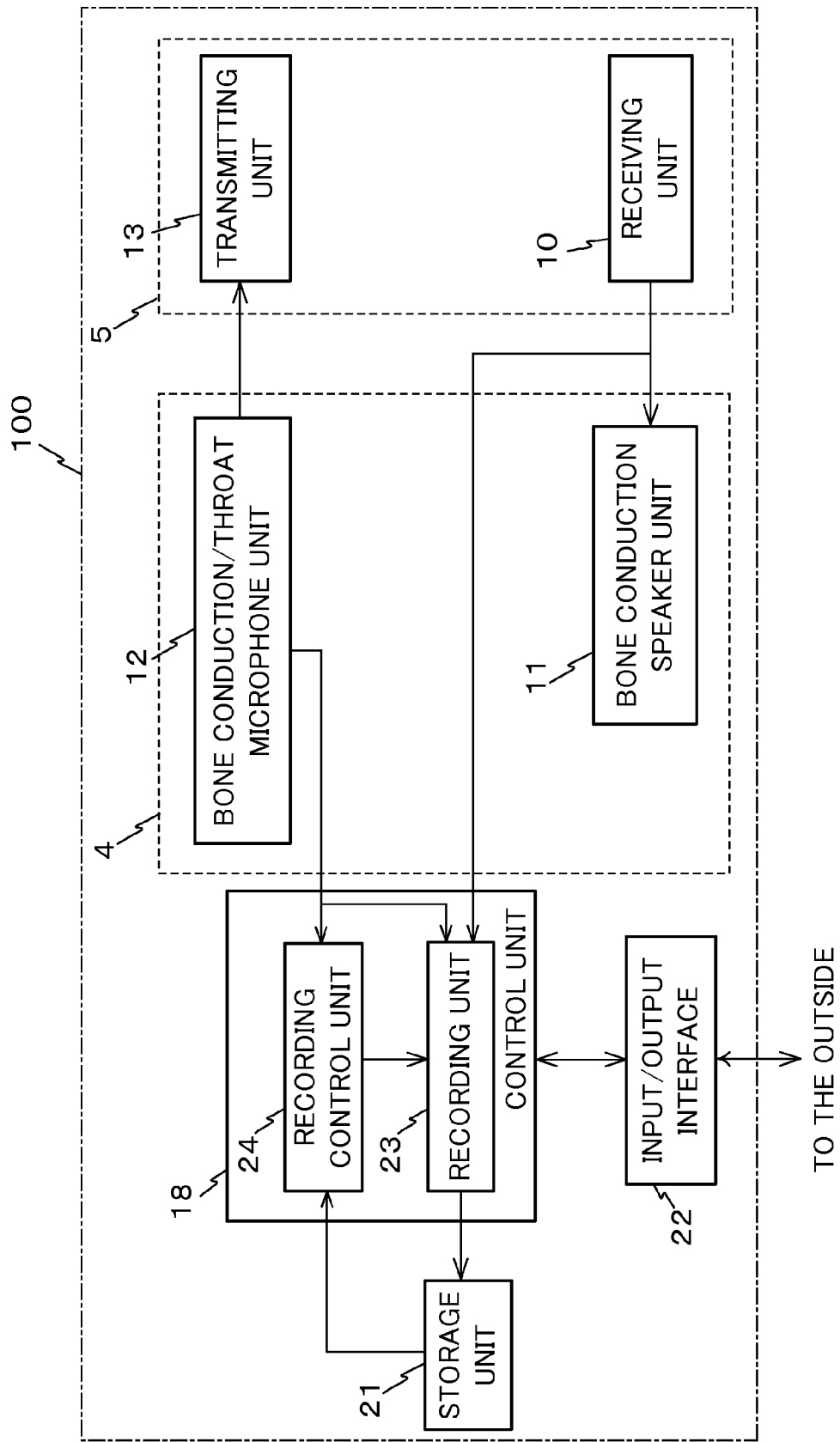
FIG. 9 is a block diagram illustrating a schematic circuit configuration of an underwater communication device according to a seventh embodiment of the invention.

As illustrated in FIG. 8, the underwater communication device 100 according to the embodiment does not have the switch 16, and the control unit 18 has a reproducing unit 25 and a reproduction control unit 26 in place of the recording unit 23 and the recording control unit 24.

The storage unit 21 stores voice data which is supplied from the outside. The voice data corresponds to, for example, music and a tour guide of diving spots. For example, such voice data can be transferred via the input/output interface 22 using a USB memory or the like and stored in the storage unit 21.

The reproducing unit 25 reproduces the voice data stored in the storage unit 21. More specifically, the reproducing unit 25 reads voice data stored in the storage unit 21 and outputs the voice data to the bone conduction speaker unit 11. The bone conduction speaker unit 11 outputs a vibration corresponding to the voice data which is output by the reproducing unit 25.

In a manner similar to the fifth embodiment, the reproduction control unit 26 starts or finishes reproduction of the voice data by the reproducing unit 25 on the basis of a voice command. Voice commands corresponding to, not only start of reproduction and finish of reproduction, but also adjustment of volume, tone, or the like, temporary stop of reproduction, fast-forward and reverse, mute, and the like may exist.

For example, a case where an operation "starting of reproduction" is associated with a voice command "reproduction start", and an operation "finishing of reproduction" is associated with a voice command "reproduction stop" in the voice command table will be described. It is assumed that voice data such as music is stored in advance in the storage unit 21.

The reproduction control unit 26 recognizes "reproduction start" included in the voice signal output from the bone conduction/throat microphone unit 12. Subsequently, the reproduction control unit 26 makes the reproducing unit 25 start reproduction of the voice data. In response to it, the reproducing unit 25 reads voice data stored in the storage unit 21 and outputs the voice data to the bone conduction speaker unit 11. As a result, the vibration generated from the bone conduction speaker unit 11 is recognized as sound by a diver. In a state where the reproducing unit 25 reproduces voice data, the reproduction control unit 26 recognizes "reproduction stop" included in the voice signal which is output from the bone conduction/throat microphone unit 12. The reproduction control unit 26 finishes reproduction of voice data by the reproducing unit 25.

As described in detail above, according to the embodiment, voice data is reproduced. Consequently, a diver can dive while listening to music, tour guide, or the like. In such a manner, a diver can enjoy diving more.

Under water, a diver carries an oxygen tank on his/her back, has many devices such as hoses, an underwater camera, and a light, and wears a protection suit and gloves, so that movement of hands is limited. According to the embodiment, reproduction of voice data can be started or finished by a voice command. Consequently, the diver can perform an operation of starting/finishing reproduction only by utterance. It further improves convenience.

According to the embodiment, since a function of conversation with another diver and a voice data reproducing function are provided in a single device, it is easy to carry, and it is advantageous also from the viewpoint of cost.

When ultrasonic waves are received from the outside, the receiving unit 10 may output a reception signal to the control unit 18. In such a manner, in the case where the receiving unit 10 receives voice data transmitted from the outside during reproduction of voice data stored in the storage unit 21, the reproduction control unit 26 can control the reproducing unit 25 so that the bone conduction speaker unit 11 outputs a vibration corresponding to the voice data received by the receiving unit 10 in priority to the voice data stored in the storage unit 21.

Concretely, by controlling the reproducing unit 25, the reproduction control unit 26 temporarily stops reproduction of voice data stored in the storage unit 21 or reduces a vibration corresponding to voice data by the bone conduction speaker unit 11. By such an operation, for example, even during reproduction of music, music which is being reproduced is stopped or volume of music is decreased in response to a call of another diver, so that voice of another diver can be heard more easily.

The reproducing unit 25 may read voice data stored in the storage unit 21 and output the voice data to the transmitting unit 13. In this case, the transmitting unit 13 transmits a voice signal corresponding to voice data reproduced by the reproducing unit 25 to the outside. By the operation, another diver can receive and listen to voice data stored in the storage unit 21. Therefore, for example, a tour guide can make a person on a tour listen to predetermined content such as safety precautions and guidance of diving spots as necessary.

The underwater communication device 100 may have a PTT button for operation separately. In this case, for example, the reproduction control unit 26 may make the reproducing unit 25 start or finish reproduction of voice data on the basis of a predetermined operation (long press, quick press of three times, or the like) on the PTT button.

Although storage of voice data is started or finished by a voice command in the embodiment, in a manner similar to the fourth embodiment, the underwater communication device 100 may have the vibration detecting unit 15. In this case, the control unit 18 may start or finish reproduction of voice data by the reproducing unit 25 on the basis of the vibration detected by the vibration detecting unit 15. The underwater communication device 100 may have the display unit 17. In this case, the control unit 18 may display start or finish of reproduction of voice data by the reproducing unit 25 on the display unit 17.

Seventh Embodiment

Next, a seventh embodiment of the present invention will be described.

The general configuration of the underwater communication device 100 according to the embodiment is the same as that illustrated in FIGS. 1A and 1B. The underwater communication device 100 according to the embodiment is different from the underwater communication devices 100 according to the fifth embodiment with respect to the point that the internal circuit configuration does not have the switch 16. A new function is added to the recording unit 23.

The receiving unit 10 outputs voice data transmitted from the outside to the recording unit 23 in addition to the bone conduction speaker unit 11. The recording unit 23 stores the voice data received by the receiving unit 10 into the storage unit 21. Obviously, as described in the fifth embodiment, the recording unit 23 can store voice data obtained by converting a voice signal output from the bone conduction/throat microphone unit 12 into the storage unit 21.

For example, the recording unit 23 stores, as stereo recording, voice data output from the receiving unit 10 and a voice signal output from the bone conduction/throat microphone unit 12 into the storage unit 21. Concretely, the recording unit 23 stores voice data output from the receiving unit 10 as L-channel data and voice data obtained by converting a voice signal output from the bone conduction/throat microphone unit 12 as R-channel data into the storage unit 21. In such a manner, when the voice data stored in the storage unit 21 is reproduced, vivid voice is reproduced.

Since there is no switch 16 in the embodiment, a voice signal output from the bone conduction/throat microphone unit 12 is always supplied to the transmitting unit 13.

For example, on assumption of the case where both of divers A and B have the underwater communication device 100 and dive for leisure, the operation of the underwater communication device 100 according to the embodiment will be described. In the following, the operation of the underwater communication device 100 of the diver A will be mainly described. When the receiving unit 10 receives voice data transmitted by the diver B, the receiving unit 10 outputs the voice data to the recording unit 23. The recording unit 23 receives the voice data and stores it in the storage unit 21. At this time, the receiving unit 10 outputs the voice data transmitted by the diver B also to the bone conduction speaker unit 11, so that a vibration generated from the bone conduction speaker unit 11 is recognized as sound by the diver A.

On the other hand, when the diver A utters sound, the bone conduction/throat microphone unit 12 senses a vocal cord vibration of the diver A, converts the vibration to a voice signal, and outputs the voice signal to the transmitting unit 13 and the control unit 18. The recording unit 23 stores voice data obtained by converting the output voice signal into the storage unit 21. By the operation, the voice data of the diver A is recorded. The transmitting unit 13 converts the voice signal which is output from the bone conduction/throat microphone unit 12 to ultrasonic wave and outputs it to the outside. By the operation, the diver B who receives the ultrasonic wave can recognize the voice uttered by the diver A.

As described above in detail, according to the embodiment, voice data transmitted from the outside and voice data based on the voice of the diver himself/herself can be stored. In doing so, voice of the diver himself/herself in a conversation with another diver and voice of the another diver can be recorded, so that log of the conversation under water can be maintained.

Also in the embodiment, on the basis of a voice command, the recording control unit 24 may make the recording unit 23 start or finish storage of voice data received by the receiving unit 10 and voice data obtained by converting a voice signal which is output from the bone conduction/throat microphone unit 12. In such a manner, a diver can record only a necessary part of a conversation with another diver only by uttering sound.

The underwater communication device 100 may have the switch 16 in the fifth embodiment. In this case, for example, the control unit 18 may output a switch signal to the switch 16 in response to output of a voice signal from the bone conduction/throat microphone unit 12 and, in the case where the voice signal is not output from the bone conduction/throat microphone unit 12 for predetermined time, output a switch signal to the switch 16. The on/off state of the switch 16 may be switched on the basis of a predetermined operation (long press, quick press of three times, or the like) on a PTT button or the like.

Also in the embodiment, in a manner similar to the fourth embodiment, the underwater communication device 100 may have the vibration detecting unit 15. The control unit 18 may control to start or finish storage of voice data by the recording unit 23 on the basis of a vibration detected by the vibration detecting unit 15. The underwater communication device 100 may have the display unit 17. In this case, the control unit 18 makes the display unit 17 start or finish storage of voice data by the recording unit 23.

The embodiments employ a type that the underwater communication device 100 is wound around the neck of a diver. The present invention, however, is not limited to the type.

Figure 10:
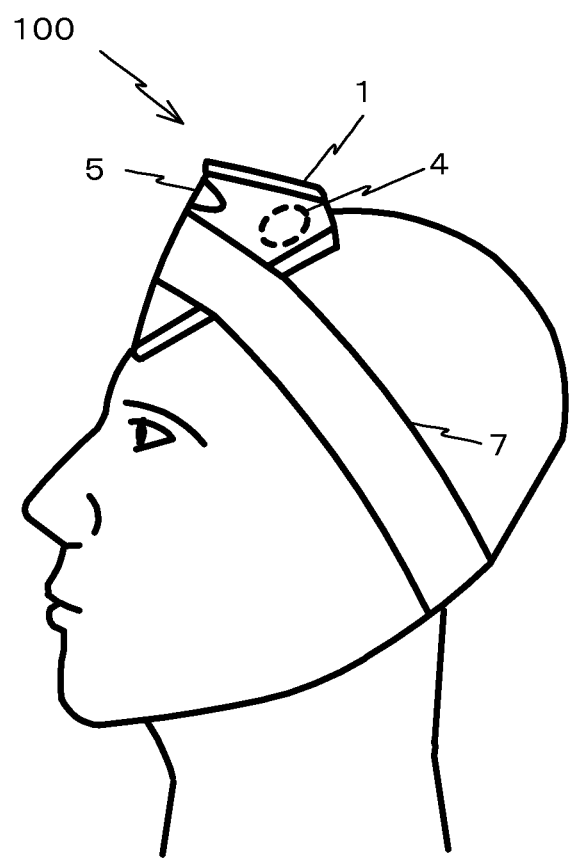
FIG. 10 is a diagram illustrating a state where the underwater communication device is put on a forehead.

Concretely, for example, as illustrated in FIG. 10, the underwater communication device 100 may be wound around the head of a diver by a band 7 which is stretching and made of an elastic member and attached to the forehead of the diver. In this case, preferably, the transceiving unit 5 is attached so that directivity of the reception antenna and the transmission antenna is toward the front of the diver, and the voice interface 4 is in contact with the forehead of the diver. In this way, high reception sensitivity is obtained, the vibration of the bone conduction speaker unit 11 is transmitted to the cochlear duct, and the bone conduction/throat microphone unit 12 can receive a vibration of vocal cords.

Figure 11:
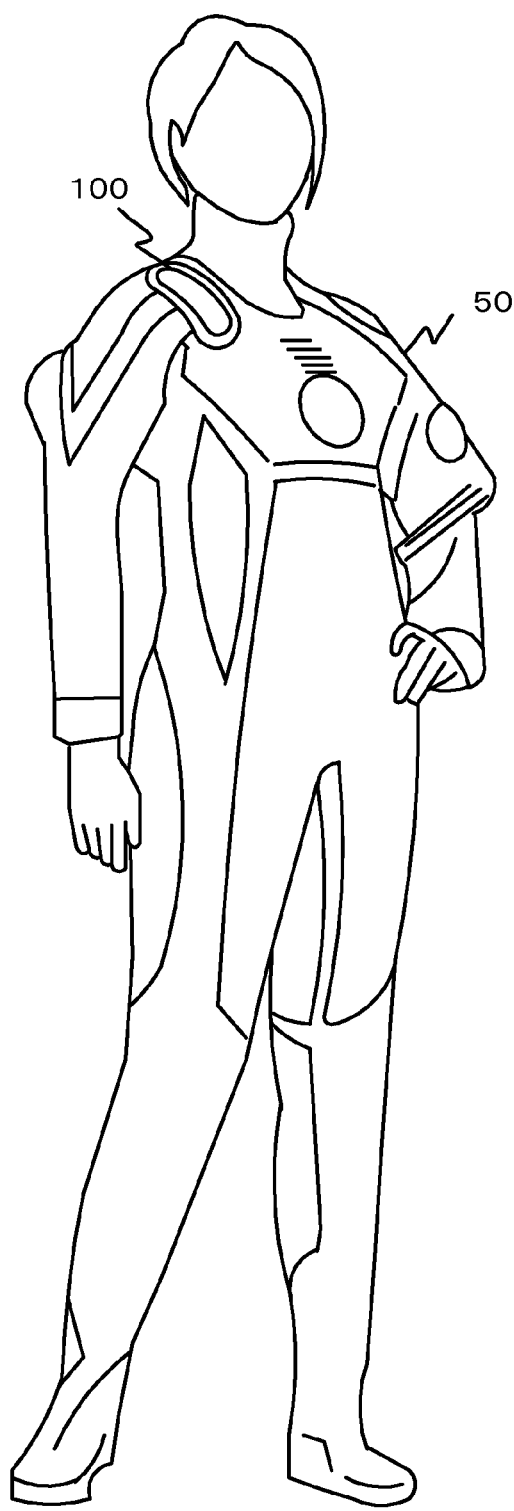
FIG. 11 is a diagram illustrating an example of an underwater communication device attached to a suit.
Figure 12:
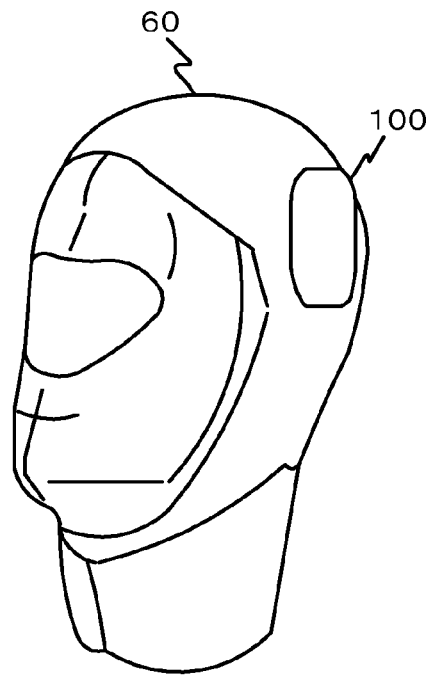
FIG. 12 is a diagram illustrating an example of an underwater communication device attached to a hood.
Figure 13:
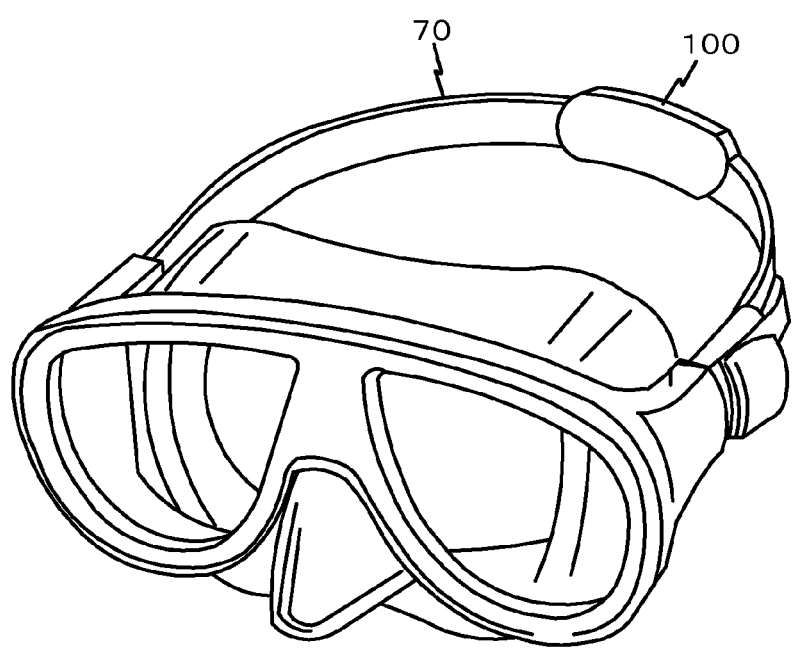
FIG. 13 is a diagram (No. 1) illustrating an example of an underwater communication device attached to a mask.
Figure 14:
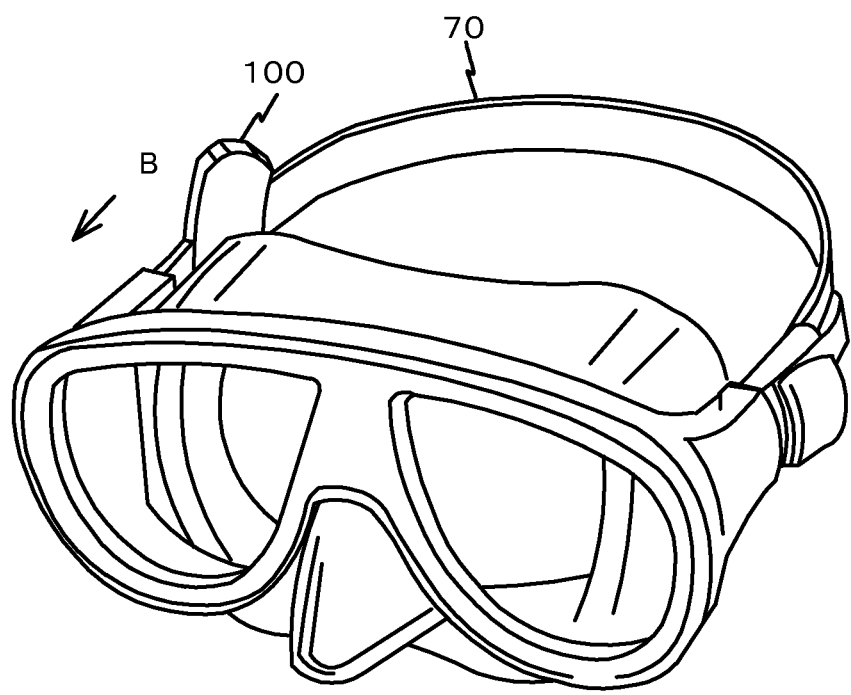
FIG. 14 is a diagram (No. 2) illustrating an example of an underwater communication device attached to a mask.

For example, as illustrated in FIG. 11, the underwater communication device 100 may be attached to a diving suit 50 which is put on a diver. As illustrated in FIG. 12, the underwater communication device 100 may be attached to a hood 60 for diving which is put on a diver. As illustrated in FIG. 13, the underwater communication device 100 may be attached to a mask strap 70 for diving which is put on a diver. In this case, as shown in FIG. 14, the underwater communication device 100 may be attached to the mask strap 70 so as to be in contact with a temple of a diver. By adjusting the directivity of the reception antenna of the receiving unit 10 and the transmission antenna of the transmitting unit 13 to the direction of arrow B in FIG. 14 as the front of a diver, the underwater communication device 100 can obtain high reception sensitivity.

The underwater communication device 100 may be attached to a mask which is put on a diver. For example, the underwater communication device 100 may be attached to a mask by an attachment or the like. In short, to fulfill the function, it is sufficient to attach the underwater communication device 100 in contact with a part of the body of a diver so that the bone conduction/throat microphone unit 12 can catch a vocal cord vibration and the vibration of the bone conduction speaker unit 11 is transmitted to the cochlear duct. Further, when the underwater communication device 100 is attached so that the directivity of the reception antenna of the receiving unit 10 and the transmission antenna of the transmitting unit 13 is set to the front of a diver, reception sensitivity can be increased.

As described above, when divers can have a conversation using the underwater communication devices 100 according to the embodiments, a diver can transmit an instruction to another diver and notify another diver of a danger. Thus, safety of each of the divers can be increased.

Some embodiments of the present invention have been described above. The present invention includes the inventions described in the scope of claims and the scope of equivalents of the inventions. Hereinafter, inventions described in the scope of initial claims of the application will be additionally described.

Supplementary Note 1

An underwater communication device to be put on a diver, including:

a receiving unit receiving voice data transmitted from the outside;

a bone conduction speaker unit outputting a vibration corresponding to the voice data received by the receiving unit; and an attachment equipment attached to the diver in a state where the bone conduction speaker unit is in contact with the diver, wherein the receiving unit and the bone conduction speaker unit are integrally attached to the attachment equipment.

Supplementary Note 2

The underwater communication device described in the supplementary note 1, the receiving unit has an antenna, and the antenna is attached so that its directivity is set to the front of the diver.

Supplementary Note 3

An underwater communication device to be put on a diver, including:

a receiving unit receiving voice data transmitted from the outside;

a bone conduction speaker unit outputting a vibration corresponding to the voice data received by the receiving unit;

a bone conduction/throat microphone unit converting a vocal cord vibration of the diver to a voice signal;

a transmitting unit transmitting the voice signal which is output from the bone conduction/throat microphone unit to the outside; and an attachment equipment attached to the diver in a state where the bone conduction speaker unit and the bone conduction/throat microphone unit are in contact with the diver.

Supplementary Note 4

The underwater communication device described in the supplementary note 3, further including a voice quality converting unit converting the voice signal which is output from the bone conduction/throat microphone unit to a voice signal of clearer voice and transmitting converted voice signal to the transmitting unit.

Supplementary Note 5

The underwater communication device described in the supplementary note 3 or 4, wherein each of the receiving unit and the transmitting unit has an antenna, and the antenna is attached so that its directivity is set to the front of the diver.

Supplementary Note 6

The underwater communication device described in any of the supplementary notes 3 to 5, further including:

a storage unit storing voice data; and a recording unit converting the voice signal which is output from the bone conduction/throat microphone unit to voice data and storing the voice data into the storage unit.

Supplementary Note 7

The underwater communication device described in the supplementary note 6, wherein the recording unit stores the voice data received by the receiving unit into the storage unit.

Supplementary Note 8

The underwater communication device described in any of the supplementary notes 3 to 5, further including:

a storage unit storing voice data which is supplied from the outside; and a reproducing unit reproducing the voice data stored in the storage unit, wherein the bone conduction speaker unit outputs a vibration corresponding to the voice data reproduced by the reproducing unit.

Supplementary Note 9

The underwater communication device described in the supplementary note 8, further including a reproduction control unit controlling the reproducing unit so that, in the case where the receiving unit receives the voice data transmitted from the outside during reproduction of the voice data stored in the storage unit, the bone conduction speaker unit outputs a vibration corresponding to the voice data received by the receiving unit in priority to the voice data stored in the storage unit.

Supplementary Note 10

The underwater communication device described in the supplementary note 8, wherein the transmitting unit transmits a voice signal corresponding to the voice data reproduced by the reproducing unit to the outside.

Supplementary Note 11

The underwater communication device described in any of the supplementary notes 1 to 10, further including:

a vibration detecting unit detecting a vibration of the device; and a control unit controlling operation of at least one of the each unit of the device on the basis of the vibration detected by the vibration detecting unit.

Supplementary Note 12

The underwater communication device described in any of the supplementary notes 3 to 10, further including a control unit recognizing a voice command from the diver included in the voice signal which is output from the bone conduction/throat microphone unit, and controlling operation of at least one of the each unit of the device on the basis of the voice command.

Supplementary Note 13

The underwater communication device described in any of the supplementary notes 1 to 12, further including a display unit displaying an operation state of at least one of the each unit of the device in visual field of the diver.

Supplementary Note 14

The underwater communication device described in any of the supplementary notes 3 to 13, wherein each of the units of the device is integrally attached to the attachment equipment.

Supplementary Note 15

The underwater communication device described in any of the supplementary notes 3 to 13, wherein at least one of the each unit of the device can be used in a state where it is apart from the attachment equipment.

Supplementary Note 16

The underwater communication device described in any of the supplementary notes 1 to 15, wherein the device has a structure which is wound around the neck of the diver.

Supplementary Note 17

The underwater communication device described in any of the supplementary notes 1 to 15, wherein the device has a structure which is attached to forehead of the diver.

Supplementary Note 18

The underwater communication device described in any of the supplementary notes 1 to 15, wherein the device is attached to a mask strap which is put on the diver.

Supplementary Note 19

The underwater communication device described in any of the supplementary notes 1 to 15, wherein the device is attached to a mask which is put on the diver.

Supplementary Note 20

The underwater communication device described in any of the supplementary notes 1 to 15, wherein the device is attached to a hood which is put on the diver.

Supplementary Note 21

The underwater communication device described in any of the supplementary notes 1 to 15, wherein the device is attached to a diving suit which is put on the diver.

The application is based on Japanese Patent Application No. 2011-011340 filed on Jan. 21, 2011. The specification, the scope of claims for patent, and the entire drawings of Japanese Patent Application No. 2011-011340 are incorporated herein by reference.

INDUSTRIAL APPLICABILITY

The present invention is suitable for a conversation in water.

DESCRIPTION OF REFERENCE NUMERALS

1 Body
2 Strings
3 Connectors
4 Voice interface
5 Transceiving unit
6 Cable
7 Band
10 Receiving unit
11 Bone conduction speaker unit
12 Bone conduction/throat microphone unit
13 Transmitting unit
14 Voice quality converting unit
15 Vibration detecting unit
16 Switch
17 Display unit
18 Control unit
19 Transmission control unit
20 Output control unit
21 Storage unit
22 Input/output interface
23 Recording unit 24 Recording control unit
25 Reproducing unit
26 Reproduction control unit
50 Diving suit
60 Hood
70 Mask strap
100 Underwater communication device

The invention claimed is:

1. An underwater communication device to be put on a diver, the underwater communication device comprising:
   a receiving unit receiving voice data transmitted from the outside;
   a bone conduction speaker unit outputting a vibration corresponding to the voice data received by the receiving unit; and
   a body as a single unit that includes the receiving unit and the bone conduction speaker unit, wherein the receiving unit and the bone conduction speaker unit are integrated with each other;
   an attachment equipment attached to the diver in a state where the bone conduction speaker unit is in contact with the diver,
   wherein the body is a component of the attachment equipment.

2. The underwater communication device of claim 1, wherein the receiver has an antenna, and the antenna is attached so that its directivity is set to the front of the diver.

3. The underwater communication device according to claim 1, further comprising:
   a vibration detecting unit detecting a vibration of the device; and
   a control unit controlling operation of at least one of the each unit of the device on the basis of the vibration detected by the vibration detecting unit.

4. The underwater communication device according to claim 1, further comprising a display unit displaying an operation state of at least one of the each unit of the device in visual field of the diver.

5. The underwater communication device according to claim 1, wherein the device has a structure which is wound around the neck of the diver.

6. The underwater communication device according to claim 1, wherein the device has a structure which is attached to forehead of the diver.

7. The underwater communication device according to claim 1, wherein the device is attached to a mask strap which is put on the diver.

8. The underwater communication device according to claim 1, wherein the device is attached to a mask which is put on the diver.

9. The underwater communication device according to claim 1, wherein the device is attached to a hood which is put on the diver.

10. The underwater communication device according to claim 1, wherein the device is attached to a diving suit which is put on the diver.

11. An underwater communication device to be put on a diver, the underwater communication device comprising:
    a receiving unit receiving voice data transmitted from the outside;
    a bone conduction speaker unit outputting a vibration corresponding to the voice data received by the receiving unit;
    a bone conduction/throat microphone unit converting a vocal cord vibration of the diver to a voice signal;
    a transmitting unit transmitting the voice signal which is output from the bone conduction/throat microphone unit to the outside;
    a body as a single unit that includes the receiving unit, the bone conduction speaker unit, the bone conduction/throat microphone unit and the transmitting unit, wherein the receiving unit, the bone conduction speaker unit, the bone conduction/throat microphone unit, and the transmitting unit are integrated with one another; and
    an attachment equipment attached to the diver in a state where the bone conduction speaker unit and the bone conduction/throat microphone unit are in contact with the diver,
    wherein the body is a component of the attachment equipment.

12. The underwater communication device of claim 11, further comprising a voice quality converting unit converting the voice signal which is output from the bone conduction/throat microphone unit to a voice signal of clearer voice and transmitting converted voice signal to the transmitting unit.

13. The underwater communication device of claim 11, wherein each of the receiving unit and the transmitting unit has an antenna, and the antenna is attached so that its directivity is set to the front of the diver.

14. The underwater communication device according to claim 11, further comprising:
    a storage unit storing voice data; and
    a recording unit converting the voice signal which is output from the bone conduction/throat microphone unit to voice data and storing the voice data into the storage unit.

15. The underwater communication device according to claim 14, wherein the recording unit stores the voice data received by the receiving unit into the storage unit.

16. The underwater communication device according to claim 11, further comprising:
    a storage unit storing voice data which is supplied from the outside; and
    a reproducing unit reproducing the voice data stored in the storage unit,
    wherein the bone conduction speaker unit outputs a vibration corresponding to the voice data reproduced by the reproducing unit.

17. The underwater communication device according to claim 16, further comprising a reproduction control unit controlling the reproducing unit so that, in the case where the receiving unit receives the voice data transmitted from the outside during reproduction of the voice data stored in the storage unit, the bone conduction speaker unit outputs a vibration corresponding to the voice data received by the receiving unit in priority to the voice data stored in the storage unit.

18. The underwater communication device according to claim 16, wherein the transmitting unit transmits a voice signal corresponding to the voice data reproduced by the reproducing unit to the outside.

19. The underwater communication device according to claim 11, further comprising:
    a vibration detecting unit detecting a vibration of the device; and
    a control unit controlling operation of at least one of the each unit of the device on the basis of the vibration detected by the vibration detecting unit.

20. The underwater communication device according to claim 11, further comprising a control unit recognizing a voice command from the diver included in the voice signal which is output from the bone conduction/throat microphone unit, and controlling operation of at least one of the each unit of the device on the basis of the voice command.

21. The underwater communication device according to claim 11, further comprising a display unit displaying an operation state of at least one of the each unit of the device in visual field of the diver.

22. The underwater communication device according to claim 11, wherein at least one of the each unit of the device can be used in a state where it is apart from the attachment equipment.

23. The underwater communication device according to claim 11, wherein the device has a structure which is wound around the neck of the diver.

24. The underwater communication device according to claim 11, wherein the device has a structure which is attached to forehead of the diver.

25. The underwater communication device according to claim 11, wherein the device is attached to a mask strap which is put on the diver.

26. The underwater communication device according to claim 11, wherein the device is attached to a mask which is put on the diver.

27. The underwater communication device according to claim 11, wherein the device is attached to a hood which is put on the diver.

28. The underwater communication device according to claim 11, wherein the device is attached to a diving suit which is put on the diver.

* * * * *